United States Patent
Maroto-Valer et al.

(10) Patent No.: US 7,604,787 B2
(45) Date of Patent: Oct. 20, 2009

(54) PROCESS FOR SEQUESTERING CARBON DIOXIDE AND SULFUR DIOXIDE

(75) Inventors: M. Mercedes Maroto-Valer, State College, PA (US); Yinzhi Zhang, State College, PA (US); Matthew E. Kuchta, State College, PA (US); John M. Andresen, State College, PA (US); Dan J. Fauth, Pittsburgh, PA (US)

(73) Assignee: The Penn State Research Foundation, University Park, PA (US)

( * ) Notice: Subject to any disclaimer, the term of this patent is extended or adjusted under 35 U.S.C. 154(b) by 781 days.

(21) Appl. No.: 10/835,241

(22) Filed: Apr. 29, 2004

(65) Prior Publication Data

US 2005/0002847 A1    Jan. 6, 2005

Related U.S. Application Data

(60) Provisional application No. 60/467,809, filed on May 2, 2003.

(51) Int. Cl.
*B01D 53/14* (2006.01)
*C01B 31/20* (2006.01)

(52) U.S. Cl. .................. 423/220; 423/230; 423/232; 423/234; 95/36

(58) Field of Classification Search .......... 423/169, 423/168, 188, 230, 338, 335, 432, 232–234; 502/233; 95/36, 151, 227
See application file for complete search history.

(56) References Cited

U.S. PATENT DOCUMENTS

| | | | | |
|---|---|---|---|---|
| 3,628,940 | A * | 12/1971 | Geissler et al. | 71/35 |
| 4,058,587 | A * | 11/1977 | Nelson | 423/220 |
| 5,780,005 | A * | 7/1998 | Olerud | 423/335 |
| 6,036,933 | A * | 3/2000 | Ramsay | 423/430 |
| 6,267,942 | B1 * | 7/2001 | Mori et al. | 423/338 |
| 6,375,735 | B1 * | 4/2002 | Stephens et al. | 106/600 |
| 6,989,142 | B2 * | 1/2006 | Liu et al. | 424/49 |
| 2001/0022952 | A1 * | 9/2001 | Rau et al. | 422/169 |

OTHER PUBLICATIONS

Kakizawa, M., A. Yamasaki, Y. Yanagisawa, "A new CO2 disposal process via artificial weathering of calcium silicate accelerated by acetic acid" Energy v26 (Apr. 2001), pp. 341-354.*
Lackner, Klaus S., Darryl P. Butt, Christopher H. Wendt, "Magnesite Disposal of Carbon Dioxide" Los Alamos, NM: Los Alamos National Laboratory; LA-UR-97-660 (1997).*
O'Connor, W.K., D. C. Dahlin, P. C. Turner, and R. Walters, "Carbon Dioxide Sequestration by Ex-situ Mineral Carbonation" DOE/ARC-99-009 (1999).*
Southwest Network for Zero Waste, "Success stories—How Texas Eastman saved money by reducing waste, a pollution prevention case" (2003) <http://www.zerowastenetwork.org/success/story.cfm?StoryID=335&RegionalCenter=>.*
"Solubility Products at 25°C", <http://www.csudh.edu/oliver/chemdata/data-ksp.htm>.*
Albert Galy, Christian France-Lanord, "Weathering processes in the Ganges-Brahmaputra basin and the riverine alkalinity budget," Chemical Geology 159 (1999), pp. 31-60.*
Qiwu Zhang, Kazumasa Sugiyama and Fumio Saito, "Enhancement of acid extraction of magnesium and silicon from serpentine by mechanochemical treatment," Hydrometallurgy, vol. 45, Issue 3, Jul. 1997, pp. 323-331.*
Lange's Handbook of Chemistry, 14$^{th}$ ed. McGraw-Hill, Inc. 1992, Section 6, pp. 6.1-6.147.
Teir et al., "Dissolution of natural serpentinite in mineral and organic acids", International Journal of Mineral Processing, vol. 83 (1-2), pp. 36-46 (2007).

* cited by examiner

*Primary Examiner*—Steven Bos
*Assistant Examiner*—Diana J Liao
(74) *Attorney, Agent, or Firm*—The Webb Law Firm

(57) ABSTRACT

A process for sequestering carbon dioxide, which includes reacting a silicate based material with an acid to form a suspension, and combining the suspension with carbon dioxide to create active carbonation of the silicate-based material, and thereafter producing a metal salt, silica and regenerating the acid in the liquid phase of the suspension.

25 Claims, No Drawings

PROCESS FOR SEQUESTERING CARBON DIOXIDE AND SULFUR DIOXIDE

CROSS REFERENCE TO RELATED APPLICATIONS

This patent claims priority to Provisional Patent Application No. 60/467,809 entitled "Process For Sequestering Carbon Dioxide and Sulfur Dioxide," which was filed on May 2, 2003, the disclosure of which is hereby incorporated by reference.

STATEMENT REGARDING FEDERALLY SPONSORED RESEARCH

This work was sponsored by the United States Department of Energy pursuant to Grant No. DE-FG2601-NT41286.

BACKGROUND OF THE INVENTION

1. Field of the Invention

The present invention relates to a process for capturing and sequestering carbon dioxide and sulfur dioxide using a silicate that is treated with an acid and optionally, a base. Specifically, the present invention relates to serpentine, olivine, or calcium silicate materials, including industrial by-products, like waste cement or calcium-rich fly ash.

2. Description of Related Art

Fossil fuels have been the predominant source of energy in the United States for over a century. However, environmental standards regarding emissions of pollutants into the air are becoming more stringent and as a result the existing state of affairs with respect to fossil fuels is undergoing significant transformation in order to accommodate these stricter standards. One of the greatest obstacles to achieving a minimal environmental impact or "zero emissions" is greenhouse gases, especially carbon dioxide emissions from the burning of fossil fuels.

Anthropogenic emissions have increased carbon dioxide concentrations in the atmosphere to at least 30% more than Pre-Industrial Era levels. Furthermore, it is estimated that future global carbon dioxide emissions will increase from about 7.4 GtC (billions of tons of atmospheric carbon) per year, which was the level in 1997, to 26 GtC per year by 2100. Issues related to the anthropogenic carbon dioxide emissions are closely scrutinized by the public, and the demand for increased carbon reductions, in connection with the large scale utilization of fossil fuels, continues to grow.

The management of carbon dioxide emissions can be achieved by (1) increasing the efficiency of energy conversion; (2) using low-carbon or carbon-free energy sources; and (3) capturing and sequestering carbon dioxide emissions. It is generally accepted that the first two alternatives provide only incremental improvements and, therefore, carbon sequestration technologies are needed to approach zero emissions. Accordingly, there is a clear need for technically sound, cost-effective sequestration processes for carbon dioxide emissions.

Mineral carbonation is a process in which magnesium-rich minerals, such as olivine ($Mg_2SiO_4$) and serpentine ($Mg_3Si_2O_5(OH)_4$), react with carbon dioxide to form geologically stable mineral carbonates:

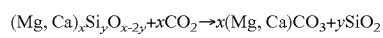

These processes mimic the naturally occurring weathering of rocks to form stable magnesium and calcium carbonates, and therefore are based on exothermic reactions. For serpentine minerals, the above reaction can be written as follows:

$$CO_2 + 1/3 Mg_3Si_2O_5(OH)_4 \rightarrow MgCO_3 + 2/3 SiO_2 + 2/3 H_2O + 64 \text{ kJ/mole}$$

The mineral carbonation approach has several inherent advantages, including a vast natural abundance of raw materials and the permanent and benign storage of $CO_2$ in solid form. In addition, the overall reaction is exothermic and therefore potentially economically viable. The primary drawback to mineral carbonation is the reaction kinetics, because these naturally occurring processes happen very slowly over geological time instead of industrial time scales. Accordingly, direct carbonation, where the minerals react directly with the carbon dioxide, has been abandoned in favor of processes which the minerals are first suspended in an aqueous carrier, because such systems have now been shown to have much faster kinetics than direct carbonation processes. It is theorized, without wishing to be bound by the theory, that the following set of reactions may occur during the reaction of serpentine with carbon dioxide in aqueous conditions:

$$CO_2 + H_2O \rightarrow H_2CO_3 \rightarrow H^+ + HCO_3^- \quad \text{(Reaction 1)}$$

$$Mg_3Si_2O_5(OH)_4 + 6H^+ \rightarrow Mg^{2+} + 2SiO_2 + 5H_2O \quad \text{(Reaction 2)}$$

$$Mg^{2+} + HCO_3^- \rightarrow MgCO_3 + H^+ \quad \text{(Reaction 3)}$$

The initial dissolution of carbon dioxide in water forms carbonic acid, which then dissociates to form bicarbonate ions and hydrogen (Reaction 1). The hydrogen ions then hydrolyze the minerals, liberating $Mg^{2+}$, and form free silica and water (Reaction 2), or alternatively silicilic acid $H_4SiO_4$ (not shown in reaction 2). The dissolved ionic species then forms magnesite, $MgCO_3$, as described in Reaction 3.

Previous studies have focused on crushing magnesium-rich minerals, such as serpentine and olivine, to a fine particle size (<37 μm) to promote surface reactions that are known to control most mineral dissolution reactions. These mineral carbonation studies require extensive communition of the raw materials (<37 μm), high partial pressures (>1950 psig), and long reaction times (>6 hours). However, all of these operations are very energy intensive. For example, pilot scale communition tests to grind the serpentine minerals to minus 200 mesh (75 μm) have reported an energy penalty of 11.5 kWh/ton of mineral processed. Previous studies have also reported that preheating the serpentine minerals to about 650° C. significantly increases their carbonation reactivity, probably due to dehydroxylation, increase in the surface area and destabilization of the crystal structure. However, this pretreatment is very energy intensive, requiring around 200 kWh/ton of serpentine, or in other words, a 20% energy penalty for a coal-fired plant.

Alternatively, magnesium can be first extracted in aqueous solution, however, any acid used for this process must be inexpensive and easily recoverable. Hydrochloric acid and acetic acid have been used to dissolve the magnesium and calcium from serpentine and wollastonite ($CaSiO_3$) minerals, respectively. However, both proposed processes present various technical challenges. For example, in the case of the hydrochloric acid extraction, some of the steps involved require energy input. For the acetic acid, only less than half of the calcium could be dissolved and the extraction kinetics were very slow, indicating that the extraction process only occurs at the surface of the wollastonite particles. Other studies have used oxalic acid, phosphoric acid, phthallic acid and combinations of these acids. However, although some of the above acids extracted the $Mg^{2+}$ from serpentine, the obtained solutions do not precipitate magnesite, which may be due to the formation of complexes.

Consequently, mineral carbonation will only become a viable cost-effective sequestration technology when faster reaction routes under milder regimes in a continuous integrated process are developed.

SUMMARY OF THE INVENTION

The present invention is directed to a process for sequestering carbon dioxide, which includes reacting a silicate based material with an acid to form a suspension, and then combining the suspension with carbon dioxide to create active carbonation of the silicate-based material, and thereafter producing a metal salt, silica and potentially regenerating the acid in the liquid phase of the suspension. The silicate based material may be a serpentine material/mineral having the formula $X_{2-3}Si_2O_5(OH)_4$ and wherein X is selected from the group consisting of Mg, Ca, $Fe^{2+}$, $Fe^{3+}$, Ni, Al, Zn, and Mn. The silicate based material can also be olivine or a calcium silicate such as wollastonite.

The process utilizes the various states of carbon dioxide including: gas, fluid, subcritical fluid, supercritical fluid, and critical fluid. The acids that are used include sulfuric acid, nitric acid, phosphoric acid, and acetic acid.

The process may further include one of two optional steps directly after the addition of the acid. The first option includes the additional step of reacting the suspension with a base after the silicate based material is reacted with the acid. An example of a base that can be used includes sodium hydroxide. The second option includes the additional steps of adding calcium nitrate to the suspension and then precipitating the metal with calcium hydroxide.

The process is carried out under less severe conditions as described in the prior art. The reaction pressure range can be from about atmospheric conditions (14 psig) to about 700 psig and the reaction temperature can occur at ambient conditions, however it can range from about 15° C. to about 50° C.

DESCRIPTION OF THE PREFERRED EMBODIMENTS

Unless otherwise indicated, all numbers, values and/or expressions referring to quantities of ingredients, reaction conditions, etc., used herein are to be understood as modified in all instances by the term "about."

Various numerical ranges are disclosed in this patent application. Because these ranges are continuous, they include every value between the minimum and maximum values of each range. Unless expressly indicated otherwise, the various numerical ranges specified in this specification and in the claims are approximations that are reflective of the various uncertainties of measurement encountered in obtaining such values.

This invention is directed to providing a cost effective carbon sequestration technology. An object of this invention is to significantly increase the reaction rates and efficiencies for forming carbonates from minerals. The process described herein enables the acceleration of carbonation efficiency without extensive mineral particle communition and without heat treatment, while lowering the temperature and pressure conditions of the carbonation reactions.

The process utilizes silicate-based minerals or materials. A non-limiting example of a silicate based material is serpentine, which occurs naturally and may be generally described by the formula of $X_{2-3}Si_2O_5(OH)_4$, wherein X is selected from the following: Mg, Ca, $Fe^{2+}$, $Fe^{3+}$, Ni, Al, Zn, and Mn, the serpentine material being a heterogeneous mixture consisting primarily of magnesium hydroxide and silica. Other examples of silicate-based minerals include, but are not limited to olivine, a natural magnesium-iron silicate ((Mg, Fe)$_2$SiO$_4$), which can also be generally described by the formula $X_2(SiO_4)_n$, wherein X is selected from Mg, Ca, $Fe^{2+}$, $Fe^{3+}$, Ni, Al, Zn, and Mn, and n=2 or 3; and a calcium silicate, such as wollastonite, which naturally occurs in metamorphic rocks. The silicate-based minerals may be used individually or in combination with each other. Additionally, the silicate based materials may be found in nature or may be manufactured. Examples of industrial by-products include but are not limited to waste cement and calcium-rich fly ash.

The size of the silicate based minerals or materials when used in the present invention can range from about 500 µm to less than 37 µm. More desirably, the size can range from about 150 µm to less than 70 µm. The prior art typically uses particles that are smaller than this, requiring a great deal of communition, which is very energy intensive.

In the process of the present invention, the silicate based minerals are treated, or are chemically activated, with an acid. This treatment or activation will form mineral salts, water, and silicon dioxide or silica in a solution or suspension. The activation temperature can range from about 15° C. to about 90° C. Desirably, the temperature ranges from about 15° C. to about 75° C. More desirably, the temperature ranges from about 20° C. to about 65° C. The activation time can range from about 0.5 hours to about 16 hours. Desirably, the activation time can range from about 1 to about 14 hours. More desirably, the activation time can range from about 3 to about 12 hours.

The process can also include one of two optional steps. One option is to add a base after the silicate based materials are treated with acid. This provides for the further conversion and sequestration of carbon dioxide. Examples of bases that can be used in the optional step of the above process include sodium hydroxide, potassium hydroxide, and ammonium hydroxide. Bases of interest may include both alkaline and alkaline earth hydroxides, high pH by-products (caustic wastes) and high pH aqueous streams (ammonia hydroxide streams). Bases that can be used contain hydroxide ion (OH—) or hydrogen carbonate ion ($HCO_3^-$), including NaOH, KOH, NaHCO$_3$, KHCO$_3$, and NH$_4$HCO$_3$. Examples of weak bases include formate ion (HCOO$^-$), acetate ion (CH$_3$COO$^-$) and dihydrogen phosphate ion ($H_2PO_4^-$). The pH range of the bases includes from 7 to 14. A non-limiting example of the use of sodium hydroxide and sequence of reactions is listed in paragraph 32.

The other option includes adding calcium nitrate Ca(NO$_3$)$_2$ after the silicate based materials are treated with acid, and then precipitating the metal with hydrated lime or calcium hydroxide (Ca(OH)$_2$). To illustrate in a non-limiting example, using serpentine as the silicate based material, the reaction sequence would be as follows:

Treat the serpentine with acid.

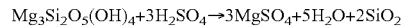

$$Mg_3Si_2O_5(OH)_4 + 3H_2SO_4 \rightarrow 3MgSO_4 + 5H_2O + 2SiO_2$$

Add aqueous solution of calcium nitrate to the suspension.

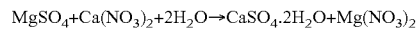

$$MgSO_4 + Ca(NO_3)_2 + 2H_2O \rightarrow CaSO_4 \cdot 2H_2O + Mg(NO_3)_2$$

Then precipitate the magnesium or other metal with calcium hydroxide, thereby regenerating the calcium nitrate for use in future reactions. The calcium nitrate can be separated from the suspension by filtration.

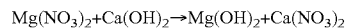

$$Mg(NO_3)_2 + Ca(OH)_2 \rightarrow Mg(OH)_2 + Ca(NO_3)_2$$

The calcium nitrate and the calcium hydroxide can each be added in an aqueous solution to the suspension. The calcium hydroxide can be prepared from pure hydrated lime or dolomitic lime or from waste cement. When using waste cements, they can first be pulverized prior to adding them to water in order to form an aqueous solution.

Carbon dioxide can then be combined with the suspension, which upon combination with the suspension will form carbonic acid, which then reacts with the metal salt (including, but not limited to Mg, Ca, $Fe^{2+}$, $Fe^{3+}$, Ni, Al, Zn, and Mn), thereby producing a metal carbonate and regenerating the acid, which may be reused. Through this process the carbon takes on a solid form and is thereby sequestered.

The process can be carried out in a vessel that provides an agitation means, a non-limiting example being a Continuously Stirred Tank Reactor (CSTR).

The acids that can be used include sulfuric acid, nitric acid, phosphoric acid, and acetic acid. Generally, protic, diprotic and triprotic acids can be used. The acids can be of a concentration from about 6.25 pH to below 3 pH when used in the present invention. Desirably, the acid used in the invention is sulfuric acid ranging at a concentration of about 6 M to below 1 M.

The carbon dioxide may be in any form such as a gas, a fluid, a subcritical fluid, a supercritical fluid and a critical fluid.

Bases that can be used in the optional step of the above process include sodium hydroxide, potassium hydroxide, and ammonium hydroxide. Bases of interest may include both alkaline and alkaline earth hydroxides, high pH by-products (caustic wastes) and high pH aqueous streams (ammonia hydroxide streams). Bases that can be used contain hydroxide ion (OH—) or hydrogen carbonate ion ($HCO_3^-$), including NaOH, KOH, $NaHCO_3$ and $KHCO_3$. Examples of weak bases include formate ion ($HCOO^-$), acetate ion ($CH_3COO^-$) and dihydrogen phosphate ion ($H_2PO_4^-$). The pH range of the bases includes from 7 to 14.

This process does not require the same high temperatures and pressures of the prior art. The pressure in the present invention ranges from about 14 psig (ambient conditions) to about 1850 psig. Desirably, the pressure can range from about 100 psig to about 650 psig. More desirably, the pressure can range from 300 psig to about 650 psig.

The temperature can range from as low as about 15° C. to about 150° C. Desirably, the temperature ranges from about 15° C. to about 50° C. More desirably, the temperature ranges from about 15° C. to about 25° C.

The surface area of the raw silicate based mineral is about 8 $m^2/g$ for serpentine, however, through chemical activation, as described above, the surface area increases from about 100 $m^2/g$ to over 330 $m^2/g$. Previous studies have shown that the carbonation reaction terminates when the reactive surface of the mineral is either depleted and/or becomes inactive by mass transfer resistance. Therefore, the active carbonation of this invention increases the exposure of the reactive surface, and hence, accelerates the carbonation reactions presumably by orders of magnitude.

For a sequestration process to be industrially feasible, it must have acceptable kinetics as well as acceptable energy needs. In order to best describe this concept, one embodiment of the invention may be used, which describes four steps that can be used for the sequestration of carbon dioxide and sulfur dioxide:

Step 1. A serpentine mineral is combined with sulfuric acid ($H_2SO_4$) to form magnesium sulfate, which is reacted with sodium hydroxide to form magnesium hydroxide.

$$Mg_3Si_2O_5(OH)_4 + 3H_2SO_4 \rightarrow 3MgSO_4 + 5H_2O + 2SiO_2$$

$$MgSO_4 + 2NaOH \rightarrow Mg(OH)_2 + Na_2SO_4$$

Step 2. When the carbon dioxide in introduced to the suspension, the magnesium sulfate and magnesium hydroxide sequester the carbon, forming $MgCO_3$.

$$MgSO_4 + H_2CO_3 \rightarrow MgCO_3 + H_2SO_4$$

$$Mg(OH)_2 + CO_2 \rightarrow MgCO_3 + H_2O$$

Step 3. The spent serpentine ($SiO_2$), which now has a high surface area can be converted into a sorbent by adding amine in order to capture $CO_2$ from flue gas.

Step 4. The spent serpentine ($SiO_2$), which also has a high surface area, can also be converted into a sorbent to enable the capture of $SO_2$ from flue gas. The captured $SO_2$, in the form of sulfate, can be dissolved in $H_2O$ as $H_2SO_4$, and can then be used for the first leaching stage.

A study of the thermodynamics involved in the process of this embodiment was conducted using a sulfuric acid and standard thermodynamic data at 298K (J. Dean, *Lange's Handbook of Chemistry*, 14th Ed., McGraw-Hill, Inc. (1992)). The reaction of serpentine with sulfuric acid is exothermic, as shown below, and therefore, can provide energy to the overall sequestration process:

$$Mg_3Si_2O_5(OH)_4 + 3H_2SO_4 \rightarrow 3MgSO_4 + 5H_2O + 2SiO_2 + 236 \text{ kJ/mole}$$

After extraction with sulfuric acid, the magnesium sulfate was reacted with sodium hydroxide to precipitate $Mg(OH)_2$ following an exothermic reaction:

$$MgSO_4 + 2NaOH \rightarrow Mg(OH)_2 + Na_2SO_4 + 139 \text{ kJ/mole}$$

Furthermore, the $Mg(OH)_2$ precipitates very readily due to its low solubility product constant, $K_{sp}$:

$$Mg(OH)_2 \rightarrow Mg^{2+} + 2OH^- \quad K_{sp} = 5.62 \times 10^{-12}$$

The $Mg(OH)_2$ was subsequently reacted with carbon dioxide in suspension at 20° C. and 600 psig. The conversion was >55%, an exothermic reaction under very mild conditions, 25° C. and 600 psig:

$$Mg(OH)_2 + CO_2 \rightarrow MgCO_3 + H_2O + 79 \text{ kcal/mole}$$

Consistent with this invention, previous studies have reported that the carbonation of $Mg(OH)_2$ results in conversions as high as 90% at low temperatures and pressures (e.g. 20° C. and 225 psig, respectively), and that such carbonation forms a precipitate that is mainly $MgCO_3 \cdot H_2O$. Therefore, the formation of $Mg(OH)_2$ is a very interesting alternative because of the inherently low carbonation processing conditions of $Mg(OH)_2$ as compared to other processes (>185° C. and >1950 psi), and the fact that the overall reaction is exothermic. Finally, an inherent advantage of carrying out the carbonation reaction at lower temperatures is that carbon dioxide solubility in water decreases with increasing temperature. For example, carbon dioxide solubility at 0° C. is 0.3346 g of gas/100 g of water, while at 60° C. the solubility decreases to 0.0576 g of gas/100 g of water.

The solubility product constant for magnesite, $MgCO_3$, is also very low and therefore favors its precipitation:

$$MgCO_3 \rightarrow Mg^{2+} + CO_3^{2-} \quad K_{sp} = 6.82 \times 10^{-6}$$

The inventors also determined that the $MgCO_3$ has a lower solubility than that of $Mg(OH)_2$ for all of the pH values (1-14), and therefore, will precipitate preferentially.

Finally, in order to minimize the costs associated with the use of acids in a process, the acids may be recovered or regenerated. In order to achieve this, the $MgSO_4$ was reacted directly with CO₂ at approximately 20° C. and low pressure (about 600 psi), and the conversion as determined by the CO₂ consumption was ~54%. Again, the overall reaction is exothermic:

$$MgSO_4+H_2CO_3 \rightarrow MgCO_3+H_2SO_4+49 \text{ kJ/mole}$$

Alternatively, the acid can be recovered following Step 4 of the above embodiment.

During the activation process, the magnesium is extracted from the serpentine mineral and forms a $Mg^{2+}$ solution that is sent to the carbonation reactor. In the carbonation reactor, the CO₂ that has been separated from the flue gas of a power plant is reacted with the $Mg^{2+}$ solution to precipitate $MgCO_3$. During this process, the sulfuric acid is regenerated and recycled to the activation reactor. The module essentially comprises two integrated units for the activation and carbonation processes.

This embodiment discloses a process to extracting $Mg^{2+}$ from serpentine, either as $MgSO_4$ or $Mg(OH)_2$ (Step 1) for its subsequent reaction with CO₂. This allows the carbonation reaction to be conducted under mild conditions (20° C. and 650 psig) compared to high temperatures and pressures (>185° C., >1850 psig) utilized in existing processes. Over 70% of the magnesium can be extracted at ambient temperature, leaving solid silica with high surface areas (over 330 m²/g) that can be used in successive steps (steps 3 and 4), while regenerating the acid used in the process. The increase in surface area is particularly significant because the extraction process only occurs on the surface.

While the invention has been particularly shown and described with reference to preferred embodiments thereof, it will be understood by those skilled in the art that various alterations in form and detail may be made therein without departing from the spirit and scope of the invention.

EXAMPLES

A magnesium silicate hydroxide sample known as serpentine ($Mg_3Si_2O_5(OH)_4$), which was obtained from the Cedar Hills Quarry along the border between Pennsylvania and Maryland. Physical activations were conducted using steam and air at 300° C. and 650° C., respectively for 3 hours. Chemical activations were conducted using a suite of acids and bases at 25-90° C. for periods of 4-24 hours. The acids included: sulfuric acid, nitric acid, phosphoric acid, and acetic acid. The bases included sodium hydroxide.

The steam activated serpentines at 650° C. resulted in surface areas of only up to 17 m²/g. Also, the steam activated serpentine had a 73% conversion to magnesite at 155° C. and 1850 psig after a reaction time on 1 hour. The untreated parent sample had a 8% conversion under the same operating conditions. Because heat treatment is very energy intensive, the steam activation was not further considered.

For the chemical activation, the use of sulfuric acid resulted in surface areas of over 330 m²/g. Additionally, more than 70% of the magnesium was dissolved from the serpentine (100 μm), and therefore, was made available for carbonation. As a result, the subsequent carbonation reaction could be conducted at ambient temperatures (20° C.) and lower pressures (600 psi). A 73% conversion was achieved after only 3 hours. This is a significant improvement over prior studies which required temperatures of over 185° C. and very high pressures of over 1850 psig, as well as extensive communition (<37 μm).

Nitrogen and carbon dioxide adsorption isotherms, scanning electron microscopy and thermogravimetric analyses were conducted in order to characterize the properties of the serpentine sample prior to and after the various treatments/surface activations.

Adsorption isotherms (N₂-77K) conducted on the raw and treated serpentine samples show that the adsorbed volume increases significantly for the activated samples compared to that of the raw serpentine sample, indicating that the activation process increases the porosity of the activated samples. Table 1, below, lists the Brunauer-Emmett-Teller (BET) surface area, pore volume and average pore size of the raw serpentine and its activated counter parts.

TABLE 1

| Sample | BET Surface Area m²/g | Pore Volume ml/g | Average Pore Diameter nm |
|---|---|---|---|
| Untreated Parent Sample | 8 | 0.017 | 8.5 |
| Steam Treated, 650° C. | 16 | 0.035 | 7.9 |
| Air Treated, 630° C. | 17 | 0.034 | 7.9 |
| Sulfuric Acid | 330 | 0.234 | 2.8 |
| Nitric Acid | 147 | 0.120 | 3.3 |
| Phosphoric Acid | 122 | 0.097 | 3.2 |
| Hydrochloric Acid | 104 | 0.092 | 3.5 |
| Sodium Hydroxide | 15 | 0.023 | 6.1 |

The BET surface area increased at least one order of magnitude to ~330 m²/g for the activated serpentines, compared to only ~8 m²/g for the raw material. Chemical activation appears to be more effective than physical activation in terms of increasing the surface area. The pore volume shows a similar trend, where activation increases the pore volume to values of 0.234 ml/g compared to only 0.017 ml/g for the parent untreated sample. The pore diameter of the chemically activated samples, whose diameter is only 2.8 nm compared to 8.5 nm for the parent sample.

Carbon dioxide adsorption isotherms at 277K were also conducted on the sulfuric acid activated serpentine sample and the raw sample. The Langmuir reported surface area of the sulfuric acid activated serpentine was 242 m²/g, compared to only 9 m²/g for the raw sample. Therefore, the chemically activated samples develop significant microporosity compared to the raw serpentine.

Below, is series of chemical reactions that occurs when using sulfuric acid with a serpentine material, which is one embodiment of the present invention:

1. A serpentine mineral is combined with sulfuric acid ($H_2SO_4$) to form magnesium sulfate, which is reacted with sodium hydroxide to form magnesium hydroxide.

$$Mg_3Si_2O_5(OH)_4+3H_2SO_4 \rightarrow 3MgSO_4+5H_2O+2SiO_2$$

$$MgSO_4+2NaOH \rightarrow Mg(OH)_2+Na_2SO_4$$

2. When the carbon dioxide in introduced to the suspension, the magnesium sulfate and magnesium hydroxide sequester the carbon, forming $MgCO_3$.

$$MgSO_4+H_2CO_3 \rightarrow MgCO_3+H_2SO_4$$

$$Mg(OH)_2+CO_2 \rightarrow MgCO_3+H_2O$$

The objective of the acid treatment process of the acid treatment process as shown in the first step, above, is to extract $Mg^{2+}$ for it subsequent reaction with carbon dioxide. Accordingly, the $Mg^{2+}$ content in the liquid phase of the suspension as well as the produced solids were measured by ICP/MS. Table 2, below summarizes the percentage of $Mg^{2+}$ extracted in solution. The sulfuric acid extraction presents the highest extraction yield, where over 70% of all the magnesium present in the parent serpentine samples was dissolved in solution. For the other acid activations investigated, the extraction yields are significantly lower. For comparison purposes, Table 2 also includes the maximum extraction yield reported for acetic acid, which is lower than reported using sulfuric acid.

TABLE 2

| Treatment | % $Mg^{2+}$ in solution | Activation Conditions |
| --- | --- | --- |
| Sulfuric Acid | 71 | 25° C., 12 hours |
| Hydrochloric Acid | 21 | 25° C., 12 hours |
| Phosphoric Acid | 25 | 25° C., 12 hours |
| Acetic Acid | 48* | 60° C., 4 hours* |

*Maximum extraction yield reported in the literature using acetic acid (Kakizawa et al., 2001).

The objective of Step 2 of this embodiment of the present invention is to convert the $Mg(OH)_2$ and $MgSO_4$ to $MgCO_3$ using a continuously stirred tank reactor (CSTR). Accordingly, a series of aqueous carbonation experiments on the parent serpentine sample and the activated samples was performed using a CSTR reactor, and the results are summarized in Table 3, below. The high temperature and pressure experiments were performed using a 1 L Hastelloy C-2000 CSTR unit, while the lower temperature and pressure carbonation reactions were conducted in a 500 mL Hastelloy C-276 CSTR vessel.

TABLE 3

| Sample | Conversion | Carbonation Conditions |
| --- | --- | --- |
| Parent, untreated | 8% | 155° C., 1850 psig, 1 hour |
| Steam treated | 70% | 155° C., 1850 psig, 1 hour |
| $Mg(OH)_2$ | >55% | 20° C., 650 psig, 3 hours |
| $MgSO_4$ | 54% | 20° C., 650 psig, 6 hours |
| Mg Acetate | 30% | 20° C., 650 psig, 3 hours |

The parent serpentine is very unreactive and it only shows 8% conversion at high temperatures and pressures, confirming the need to activate the mineral prior to carbonation. The steam activated serpentine had a 73% conversion to magnesite at 155° C. and 1850 psig after 1 hour reaction. However, because of the high energy requirement for the steam activation route, this was not considered any further.

Following the serpentine extraction (100 μm) with sulfuric acid, the magnesium sulfate was reacted with carbon dioxide in solution at 20° C. and low pressure (about 600 psi), and the conversion was determined by the carbon dioxide consumption was ~54%. After the extraction with sulfuric acid, the magnesium sulfate was reacted with sodium hydroxide to precipitate the magnesium hydroxide that was subsequently reacted with carbon dioxide at 20° C. and 600 psi, and the conversion was >55%. This is indeed a significant improvement over previous studies that required temperatures above 185° C. and very high pressures (greater that 1950 psi) as well as extensive communition (37 μm).

The invention claimed is:

1. A process for sequestering carbon dioxide, comprising:
   a) reacting a silicate based material with an acid to form a suspension, wherein the acid is selected from the group consisting of sulfuric acid and nitric acid, and wherein the silicate base material comprises magnesium; and
   b) combining said suspension with carbon dioxide, producing a metal salt, silica and regenerating said acid in solution.

2. The process in claim 1, wherein the silicate based material further comprises a serpentine material according to the formula $X_nSi_2O_5(OH)_4$; wherein X is selected from the group consisting of Mg, Ca, $Fe^{2+}$, $Fe^{3+}$, Ni, Al, Zn, and Mn; n is 2 or 3, said serpentine material being a mixture of hydroxide and silica.

3. The process of claim 1, wherein the silicate based material is selected from the group consisting of olivine, serpentine, wollastonite, and magnesium silicate.

4. The process of claim 1, wherein the acid reacts with the silicate based material, wherein the silica achieves a BET surface area greater than 122 $m^2/g$.

5. The process of claim 1, wherein the acid is sulfuric acid.

6. The process of claim 1, further including an additional step of reacting the suspension with a base after the silicate based material is reacted with the acid.

7. The process of claim 6, wherein the base is sodium hydroxide.

8. A process for sequestering carbon dioxide, comprising:
   a) reacting a silicate based material with an acid to form a suspension, wherein the acid is selected from the group consisting of sulfuric acid and nitric acid;
   b) combining said suspension with carbon dioxide, producing a metal salt, silica and regenerating said acid in solution; and
   c) directly after the silicate based material is reacted with the acid, reacting the suspension with calcium nitrate ($Ca(NO_3)_2$) and then adding calcium hydroxide (Ca$(OH)_2$) to precipitate the metal, wherein the silicate based material comprises a metal selected from the group consisting of Mg, $Fe^{2+}$, $Fe^{3+}$, Ni, Al, Zn, and Mn.

9. The process of claim 1, wherein the silica has a BET surface area of about 100 to about 330 $m^2/g$ after the addition of the acid.

10. The process of claim 1, wherein the reacting step is conducted at temperature ranges from about 15° C. to about 50° C.

11. The process of claim 1, wherein the process is conducted at pressure ranges from about 14 psig (ambient conditions) to about 1850 psig.

12. A process for sequestering carbon dioxide as in claim 1, wherein said acid is protic, diprotic or triprotic and pH from about 6.25 to about 3.

13. A process for sequestering carbon dioxide as in claim 6, wherein said base includes both alkaline and alkaline earth hydroxides, high pH by-products and high pH aqueous streams, and said base has a pH in the range between 7 and 14.

14. A process for sequestering carbon dioxide, comprising:
   a) reacting a silicate based material with sulfuric acid to form a suspension, wherein the silicate based material comprises magnesium;
   b) reacting the suspension with a base to precipitate a metal hydroxide; and
   c) combining said suspension with carbon dioxide, producing a metal carbonate and regenerating said sulfuric acid.

15. The process of claim 14, wherein the silicate based material is selected from the group consisting of olivine and serpentine.

16. The process of claim 14, wherein the form of the carbon dioxide is selected from the group consisting of a gas, a fluid, a subcritical fluid, a supercritical fluid, and a critical fluid.

17. The process of claim 14, wherein said sulfuric acid has an initial concentration ranging from about 6 M to about 1 M.

18. The process of claim 14, wherein the base is sodium hydroxide.

19. The process of claim 14, wherein the sulfuric acid reacts with the silicate based material, wherein the silica achieves a BET surface area ranging from about 100 to about 330 $m^2/g$.

20. A process for sequestering carbon dioxide, comprising:
   a) reacting a silicate based material with sulfuric acid, to form a suspension, wherein the silicate based material comprises a metal selected from the group consisting of Mg, $Fe^{2+}$, $Fe^{3+}$, Ni, Al, Zn, and Mn;
   b) mixing calcium nitrate $Ca(NO_3)_2$ with said suspension;
   c) precipitating the metal using calcium hydroxide $Ca(OH)_2$; and
   combining the suspension with carbon dioxide to sequester the carbon dioxide, producing a metal salt and silica and regenerating the sulfuric acid.

21. The process of claim 20, wherein the silicate based material is selected from the group consisting of olivine, serpentine, and calcium silicate.

22. The process of claim 4, wherein the BET surface area is equal to or greater than about 147 $m^2/g$.

23. The process of claim 14, wherein the sulfuric acid reacts with the silicate based material, wherein the silica achieves a BET surface area equal to or greater than about 147 $m^2/g$.

24. The process of claim 23, wherein the BET surface area is equal to or greater than about 330 $m^2/g$.

25. A process for sequestering carbon dioxide, comprising:
   a) reacting a silicate based material with an acid to form a suspension, wherein the acid is selected from the group consisting of sulfuric acid and nitric acid, wherein the silicate base material comprises magnesium, and wherein more than about 70% of the magnesium is dissolved from the silicate based material; and
   b) combining said suspension with carbon dioxide, producing a metal salt, silica and regenerating said acid in solution.

* * * * *

UNITED STATES PATENT AND TRADEMARK OFFICE
CERTIFICATE OF CORRECTION

PATENT NO. : 7,604,787 B2
APPLICATION NO. : 10/835241
DATED : October 20, 2009
INVENTOR(S) : Maroto-Valer et al.

It is certified that error appears in the above-identified patent and that said Letters Patent is hereby corrected as shown below:

The following paragraph should be inserted on the Face of the Patent, and at Column 1, immediately before "BACKGROUND OF THE INVENTION":

-- STATEMENT REGARDING FEDERALLY SPONSORED RESEARCH
This invention was made with government support under Contract No. DE-FG26-01-NT41286, awarded by the United States Department of Energy. The Government has certain rights in the invention. --

Signed and Sealed this

Twenty-seventh Day of April, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,604,787 B2 | Page 1 of 1 |
| APPLICATION NO. | : 10/835241 | |
| DATED | : October 20, 2009 | |
| INVENTOR(S) | : Maroto-Valer et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1045 days.

Signed and Sealed this

Fifth Day of October, 2010

David J. Kappos
*Director of the United States Patent and Trademark Office*